United States Patent
Worm et al.

(10) Patent No.: US 11,956,877 B2
(45) Date of Patent: Apr. 9, 2024

(54) LIGHTING UNIT FOR EXECUTING MULTIPLE LIGHTING CONTROL COMMANDS AND A METHOD THEREOF

(71) Applicant: SIGNIFY HOLDING B.V., Eindhoven (NL)

(72) Inventors: Kevin Thomas Worm, Eindhoven (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 135 days.

(21) Appl. No.: 17/779,078

(22) PCT Filed: Nov. 23, 2020

(86) PCT No.: PCT/EP2020/083021
§ 371 (c)(1),
(2) Date: May 23, 2022

(87) PCT Pub. No.: WO2021/105044
PCT Pub. Date: Jun. 3, 2021

(65) Prior Publication Data
US 2022/0418074 A1    Dec. 29, 2022

(30) Foreign Application Priority Data
Nov. 28, 2019   (EP) .................................. 19212161

(51) Int. Cl.
*H05B 47/19*      (2020.01)
*H05B 47/155*      (2020.01)
(52) U.S. Cl.
CPC ........... *H05B 47/19* (2020.01); *H05B 47/155* (2020.01)

(58) Field of Classification Search
CPC ....... H05B 47/19; H05B 47/155; Y02B 20/40
USPC ........................................................ 315/307
See application file for complete search history.

(56) References Cited

U.S. PATENT DOCUMENTS

| | | | | |
|---|---|---|---|---|
| 9,784,417 B1* | 10/2017 | Springer | ............... | F21V 23/006 |
| 9,820,361 B1* | 11/2017 | Turvy, Jr. | ............... | H04L 12/18 |
| 11,147,147 B2* | 10/2021 | Meerbeek | ............... | H05B 47/19 |
| 2013/0147395 A1* | 6/2013 | Cook | ................... | H05B 47/155 |
| | | | | 315/312 |
| 2013/0328502 A1* | 12/2013 | Hovey | ................. | H05B 47/195 |
| | | | | 315/307 |
| 2016/0295669 A1* | 10/2016 | Thijssen | ................. | H05B 47/19 |
| 2018/0124895 A1* | 5/2018 | Alexander | .............. | F21S 2/005 |
| 2018/0158460 A1* | 6/2018 | Lee | ......................... | G10L 15/22 |
| 2018/0288852 A1* | 10/2018 | Davies | ................... | H04B 10/54 |

(Continued)

*Primary Examiner* — Ryan Jager

(57) ABSTRACT

A lighting unit (102) is disclosed. The lighting unit comprises: one or more light sources (110), a memory (108), a communication unit (104) comprising a first communication module (104a) configured to communicate via a first wireless communication technology, and a second communication module (104b) configured to communicate via a second wireless communication technology, and a processor (106) configured to receive, via the first communication module (104a), a first lighting control command (122), store the first lighting control command (122) in the memory (108), receive, via the second communication module (104b), a second lighting control command (124), and control the one or more light sources (110) according to the first lighting control command (122) upon receiving the second lighting control command.

13 Claims, 4 Drawing Sheets

(56) References Cited

U.S. PATENT DOCUMENTS

2020/0314980 A1\* 10/2020 Van De Sluis ........ H05B 45/14
2021/0212187 A1\* 7/2021 Meerbeek .............. H05B 47/19
2022/0418074 A1\* 12/2022 Worm .................... H05B 47/19

\* cited by examiner

400

LIGHTING UNIT FOR EXECUTING MULTIPLE LIGHTING CONTROL COMMANDS AND A METHOD THEREOF

CROSS-REFERENCE TO PRIOR APPLICATIONS

This application is the U.S. National Phase application under 35 U.S.C. § 371 of International Application No. PCT/EP2020/083021, filed on Nov. 23, 2020, which claims the benefit of European Patent Application No. 19212161.4, filed on Nov. 28, 2019. These applications are hereby incorporated by reference herein.

FIELD OF THE INVENTION

The invention relates to a lighting unit, a lighting system and a method for controlling the lighting unit based on multiple lighting control commands.

BACKGROUND

Connected home and office lighting systems enable users to control the light output of lighting units with their smartphones, light switches and other lighting control devices. These lighting control devices communicate light settings via lighting control commands to the lighting units. Lighting control commands may be communicated to the lighting units, via, for example, the Zigbee and/or Bluetooth communication protocols.

In certain contexts, it may be required that multiple lighting control commands are communicated to one or more lighting units. A lighting unit (e.g. an LED strip) may, for example, comprise a plurality of individually addressable light sources for which different lighting control commands are communicated to the lighting unit. In another example, when one or more lighting units are controlled based on a dynamic light setting (to render a dynamic light effect that changes over time), multiple lighting control commands need to be communicated to the one or more lighting units. The bandwidth of certain communication technologies (e.g. Zigbee) may be limited, which would result in that lighting control commands do not reach the respective lighting units in time, or even not at all.

US 2013/0328502 A1 discloses coordinated visual presentation using audience display devices. A control unit is connected to an input node in order for processor to receive communications and store the communications in memory or initiate a macro command by processor to utilize audience display device. Input node may include a plurality of sensors, thus allowing for optical communications, radio communications, and/or wired communications. The input node receives communications relating to an audience device such as a trigger signal or a control message. A trigger signal may be a command including a countdown timer to execute some code and/or macro command. A control message may include a command that instructs the input node to save the balance of the control message as a macro command in memory. Additionally, a macro command may include code executable by processor of audience display device. Such code may correspond to visual outputs on visual output devices.

SUMMARY OF THE INVENTION

It is therefore an object of the present invention to provide a lighting unit and a lighting system able to communicate and process an increased number of lighting control commands.

According to a first aspect of the present invention, the object is achieved by a lighting system comprising a first lighting unit and a second lighting unit:

the first lighting unit comprising:
one or more light sources,
a memory,
a communication unit comprising a first communication module configured to communicate via a first wireless communication technology, and a second communication module configured to communicate via a second wireless communication technology, and
a processor configured to receive, via the first communication module, a first lighting control command indicative of one or more first light settings, store the first lighting control command in the memory, receive, via the second communication module, a second lighting control command indicative of one or more second light settings, and control the one or more light sources according to the first lighting control command upon receiving the second lighting control command, the second lighting unit comprising:
one or more light second sources
a second communication unit configured to communicate via the second communication technology, and
a second processor configured to receive, via the second communication unit, the second lighting control command, and to control the one or more second light sources according to the second lighting control command upon receiving the second lighting control command.

The first lighting unit is provided with a communication unit that comprises two communication modules: a first communication module configured to communicate via a first wireless communication technology, and a second communication module configured to communicate via a second wireless communication technology. The processor of the first lighting unit is configured to (first) receive lighting control commands via the first communication protocol, store those first lighting control commands in the memory, and the execute the first lighting control commands upon receiving a second lighting control command via the second wireless communication technology. This enables a lighting controller to communicate the first lighting control commands via the first wireless communication technology (e.g. a higher bandwidth communication technology such as BLE or Wi-Fi). These first lighting control commands are then stored in the memory of the first lighting unit. The lighting controller may then communicate the second lighting control command via the second wireless communication technology (e.g. a lower bandwidth communication technology such as Zigbee), whereupon the first and second lighting control commands are executed. This enables the lighting controller to execute the first lighting control command by transmitting the second lighting control command. The second lighting control command is used as a trigger for executing the first lighting control command. This enables the lighting controller to transmit one or more first lighting control commands, and transmit the second lighting control command at a (predefined) time and, as such, use the second lighting control command as a trigger for timed execution of the first and second lighting control commands. This further enables the lighting controller to communicate a larger number of lighting control commands to the first lighting unit, and it enables the first lighting unit to process the larger number of lighting control commands accordingly.

The inventors have realized that when a lighting system comprises multiple lighting units that are to be controlled in a (substantially) synchronous manner, it may be beneficial to first transmit one or more first lighting control commands (via the first communication technology) to one or more of the plurality of lighting units and store these commands, and then transmit the second lighting control command (via the second communication technology) to the plurality of lighting units, in order to trigger (substantially synchronous) execution of the first and second lighting control commands at the plurality of lighting units.

The second lighting unit may be unable to communicate via the first wireless communication technology. In other words, a communication unit of the second lighting unit may be configured to receive second lighting control commands via the second wireless communication technology, but unable to receive first lighting control commands via the first wireless communication technology. The lighting system may comprise different types of lighting units (e.g. a first lighting unit comprising a communication unit comprising the first and second communication module (e.g. a BLE and a Zigbee module) and a second lighting unit comprising the second communication module only (e.g. a Zigbee module)). One of the lighting units may be more advanced and configured to, for example, store lighting control commands, control multiple individually addressable light sources, etc., whereas the other lighting unit may be less advanced and configured to control a single light source based on a (second) lighting control command. Therefore, transmitting one or more first lighting control commands to the more advanced lighting unit, and triggering the execution thereof by sending the second lighting control command to both the more advanced and the less advanced lighting unit, the lighting system can control multiple different lighting units in an harmonized (e.g. synchronized) manner.

The processor may be further configured to control the one or more light sources according to the second lighting control command upon receiving the second lighting control command. As such, the second lighting control command is used both as a trigger for executing the first lighting control command and for controlling the light output of the first lighting unit. Hence, no dedicated signal for executing the first lighting control command is required, which reduces bandwidth usage.

The processor may be configured to receive a plurality of first lighting control commands via the first communication module, store the plurality of first lighting control commands in the memory, and control the one or more light sources according to the plurality of first lighting control commands upon receiving the second lighting control command. The plurality of first lighting control commands may, for example, be addressed to different light sources of the first lighting unit and/or be part of a dynamic light setting which is to be executed by the first lighting unit. The plurality of first lighting control commands may be comprised in a single message or in multiple messages.

The first lighting unit may comprise a first light source and a second light source, and a primary first lighting control command (of a plurality of first lighting control commands) may be addressed to the first light source and a secondary first lighting control command (of the plurality of first lighting control commands) may be addressed to the second light source. The processor may be further configured to control the first light source according to the primary first lighting control command and the second light source according to the secondary first lighting control command upon receiving the second lighting control command. This enables the first lighting unit to receive and buffer a plurality of first lighting control commands for a plurality of light sources of the first lighting unit, and execute them when the second lighting control command is received.

The processor may be further configured to obtain information indicative of a temporal sequence of the plurality of first lighting control commands, and the processor may be configured to control the one or more light sources based on the temporal sequence. The plurality of first lighting control commands may define a dynamic light setting. The dynamic light setting may, for example, be a loop of light settings, be based on (dynamic) media content such as a video or music, a predefined set of light settings for creating a specific atmosphere, etc. The information indicative of a temporal sequence may be part of a message that also comprises one or more of the plurality of first lighting control command, or the information may be received as a separate message. Alternatively, the information indicative of the temporal sequence may be determined based on the order wherein the plurality of first lighting control commands have been received.

The first wireless communication technology may have a higher bandwidth than the second wireless communication technology. This may be beneficial, because the higher bandwidth communication technology can be used for receiving a plurality of first lighting control commands, and the lower bandwidth communication technology can be used as the trigger for executing the (plurality of) first lighting control commands. The plurality of first lighting control commands may be comprised in a single message or in multiple messages, and the second lighting control command may be a single message. The size of the messages may be defined by the communication technology. For example, messages transmitted via the first communication technology may contain more data than messages of the second communication technology. Advantageously, the use of the communication technologies is optimized.

The first wireless communication technology may be a point-to-point communication technology (such as Bluetooth, Bluetooth Low Energy (BLE), Infrared (IR), near field communication (NFC), wireless local area communication (Wi-Fi), etc.), and the second wireless communication technology may be a multi-hop communication technology (such as ZigBee, Thread, WirelessHART, SmartRF, Bluetooth Mesh, or any other mesh or tree-based technology). This is beneficial, because the first lighting control commands are communicated from point to point instead of via multiple intermediate nodes, thereby minimizing the number of message/the amount of traffic.

Alternatively, the first wireless communication technology may be a multi-hop communication technology, and the second wireless communication technology may be a point-to-point communication technology. This may be beneficial, because the timing of the receipt of the first lighting control commands (which may be received via multiple hops) at the first lighting unit may be less relevant compared to the timing of the receipt of the second lighting control command (which may be received directly from the transmitter).

The second lighting control command may be comprised in a broadcast message, a multicast message or an inter-PAN message. This is beneficial, because the execution of the first lighting control command and the second lighting control command is executed at substantially the same moment in time (i.e. at the moment of receipt of the second lighting control command by the respective lighting units), thereby improving synchronization of the execution of the control commands at the first and second lighting units.

The first lighting control command may be comprised in a unicast message. The unicast message may be addressed to the first lighting unit. The first lighting control command may comprise dedicated control instructions for individual lighting units, whereas the second lighting control command may serve as both a lighting control command and a trigger for executing control commands at the first and second lighting units.

The lighting system may further comprise a lighting controller comprising a transmitter configured to transmit the first and second lighting control commands.

The lighting controller may be configured to communicate the first lighting control command to the first lighting unit directly, and to communicate the second lighting control command to the first and second lighting units via an intermediary device. This is beneficial when the lighting controller is unable to communicate via the second communication technology.

The lighting controller may be configured to obtain the first and second lighting control commands based on media content. When rendering light effects based on media content across multiple lighting devices, it may be important that the effects are rendered synchronously. The light effects may be defined by a light script, or be determined based on an analysis of the media content (e.g. by analyzing images of video content or analyzing audio characteristics of audio content).

The lighting controller may be configured to switch between a first mode, wherein first lighting control commands are to be executed upon receipt of the second lighting control command, and a second mode, wherein first lighting control commands are to be executed immediately. The lighting controller may therefore switch between the first and second mode, for example based on the (media) content or based on a dynamic light effect that is to be rendered by the first and second lighting units.

According to a third aspect of the present invention, the object is achieved by a method of controlling a first lighting unit and a second lighting unit, the first lighting unit comprising one or more light sources and a memory, and wherein the first lighting unit further comprises a communication unit comprising a first communication module configured to communicate via a first wireless communication technology and a second communication module configured to communicate via a second wireless communication technology, the second lighting unit comprising one or more light second sources and a second communication unit configured to communicate via the second communication technology, the method comprising:

- receiving, via the first communication module, a first lighting control command indicative of one or more first light settings,
- storing the first lighting control command in the memory,
- receiving, via the second communication module, a second lighting control command indicative of one or more second light settings,
- controlling the one or more light sources according to the first lighting control command upon receiving the second lighting control command,
- receiving, via the second communication unit, the second lighting control command, and
- controlling the one or more second light sources according to the second lighting control command upon receiving the second lighting control command.

According to a third aspect of the present invention, the object is achieved by a computer program product for a computing device, the computer program product comprising computer program code to perform the method when the computer program product is run on a processing unit of the computing device.

It should be understood that the computer program product and the method may have similar and/or identical embodiments and advantages as the above-mentioned lighting units and lighting systems.

In the context of the present invention, the term "lighting control command" is indicative of one or more light settings (such as color, intensity, saturation, beam size, beam shape properties), comprised in a message, for controlling the light output generated by a lighting unit that receives the lighting control command.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
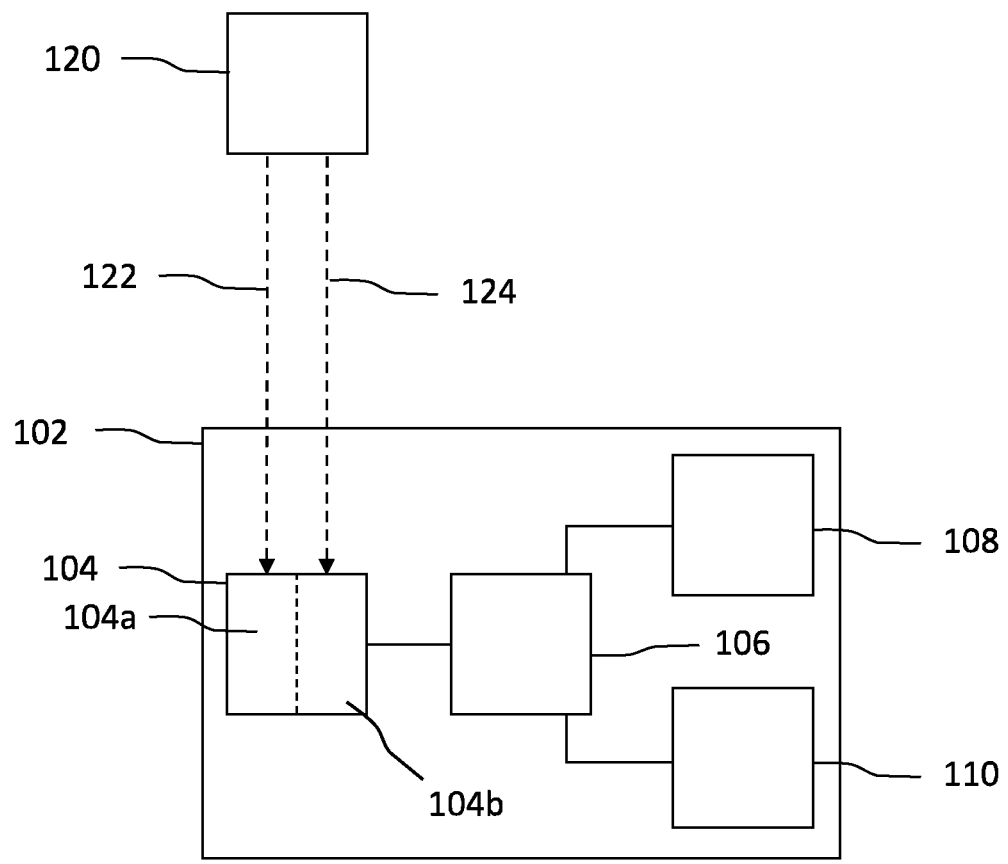
FIG. 1 shows schematically an embodiment of a lighting system comprising a lighting unit and a controller for transmitting lighting control commands to the lighting unit.

FIG. 1 shows schematically a lighting system 100 comprising a first lighting unit 102 and a lighting controller 120 for transmitting lighting control commands 122, 124 indicative of light settings to the first lighting unit 102. The first lighting unit 102 comprises one or more light sources 110, a memory 108, a communication unit 104 and a processor 106 (e.g. a microcontroller, a microchip, circuitry, etc.).

The communication unit 104 comprises a first communication module 104a configured to communicate via a first wireless communication technology, and a second communication module 104b configured to communicate via a second wireless communication technology (different from the first communication technology). The first wireless communication technology may be a multi-hop (mesh) communication technology and the second wireless communication technology may be a point-to-point communication technology. The first wireless communication technology may for instance a first network technology such as ZigBee, and the second wireless communication technology may for instance be a second network technology such as BLE. These modules 104a, 104b may be separate units (e.g. separate radio chips) or be both comprised on a single radio chip, allowing a low-cost device to operate as part of both a first network and a second network at the same time, leveraging a single wireless radio module. This may be achieved by fast switching the first and second communication technology (e.g. ZigBee and BLE) operations over time such that the device remains connected and operates in both networks simultaneously. BLE and ZigBee combined radio is an example, and the present invention is equally applicable to any other combination of wireless communication technologies (e.g. BLE, Infrared (IR), near field communication (NFC), wireless local area communication (Wi-Fi), ZigBee, Thread, WirelessHART, SmartRF, etc.). The first wireless communication technology may have a higher bandwidth than the second wireless communication technology.

The processor 106 is configured to receive a first lighting control command 122 indicative of one or more first light settings (e.g. color, intensity, saturation, beam size, beam shape properties, etc.) via the first communication module 104a, and a second lighting control command 124 indicative of one or more second light settings (e.g. color, intensity, saturation, beam size, beam shape properties, etc.) via the second communication module 104b. The lighting control commands 122, 124 may be received from a lighting controller 120. The lighting controller 120 may for example, be a central lighting controller, such as a hub, a bridge, a smartphone, a voice assistant, a media player for controlling the light based on the media content, etc.

The processor 106 is further configured to store the first lighting control command 122 in the memory 108 (e.g. flash memory), and to and control the light source 110 according to the one or more first light settings of the first lighting control command 122 (and optionally according to the one or more second light settings of the second lighting control command 124) upon receiving the second lighting control command 124. The second lighting control command 124 is used as a trigger for executing the first lighting control command. The memory 108 may, for example, be further configured to store light scenes, which may comprise associations between lighting control commands and light settings. The processor 106 may be further configured to select a light setting from the memory 108 based on a received lighting control command.

The second lighting control command 124 may comprise no explicit instruction for executing the first lighting control command 122, and the processor 106 of the lighting unit 100 may be configured to interpret the second lighting control command 124 as a command to execute the first lighting control command 122, and, optionally, subsequently the second lighting control command 124. Alternatively, the first lighting control command 122 and/or the second lighting control command 124 may comprise an instruction for executing the first lighting control command 122. The instruction may, for example, be indicative of a sequence in which a plurality of first lighting control commands 122 are to be executed, and/or be indicative of a sequence in which the first and the second lighting control commands 122, 124 are to be executed, and/or be indicative of timing information indicating when to execute certain lighting control commands.

The processor 106 may be further configured to control the one or more light sources 110 according to both the first lighting control command 122 and the second lighting control command 124 upon receiving the second lighting control command 124. The processor 106 may, for example, control the one or more light sources 110 sequentially based on the first and second lighting control command 122, 124 (e.g. based on information indicative of a temporal sequence, or in the order of receipt, etc.). Additionally or alternatively, the processor 106 may, for example, control a first light source of a plurality of light sources of the first lighting unit 102 based on the first lighting control command 122, and control a second light source of the plurality of light sources based on the second lighting control command 124.

The first lighting unit 102 comprises one or more light sources 110, e.g. LED light sources. The first lighting unit 102 may be any type of first lighting unit 102 arranged for receiving lighting control commands. The first lighting unit 102 may be arranged for providing general lighting, task lighting, ambient lighting, atmosphere lighting, accent lighting, entertainment lighting, etc. The first lighting unit 102 may be installed in a luminaire or in a lighting fixture. The first lighting unit 102 (e.g. an LED strip or a lighting tile) may be a two or three dimensional array of light sources. The first lighting unit 102 may be a portable lighting device or a wearable lighting device.

The processor 106 may be configured to receive a plurality of first lighting control commands 122 via the first communication module 104a, and to store the plurality of first lighting control commands 122 in the memory 108. The processor 106 may further control the light source 110 according to the plurality of first lighting control commands (and optionally the second lighting control command) upon receiving the second lighting control command.

The plurality of first lighting control commands 122 may, for example, be addressed to individual light sources 110 (e.g. LEDs) of the first lighting unit 102. The first lighting unit 102 (for example, be an LED strip or a lighting tile) may comprise a plurality of individually controllable/addressable light sources 110. The processor 106 may store the plurality of first lighting control commands 122 in the memory 108, and control the individually controllable/addressable light sources 110 accordingly when the second lighting control command 124 has been received. The processor 106 may further receive instructions indicating which first lighting control command 122 is intended for which one or more light sources 110 of the first lighting unit 102, and the processor 106 may control the light sources accordingly upon receipt of the second lighting control command 124. The instructions may be comprised in a dedicated message, or, for example, in one or more of the first lighting control commands or in the second lighting control command.

The processor 106 may be further configured to obtain information (instructions) indicative of a temporal sequence of the plurality of first lighting control commands 122. The processor 106 may be configured to control the one or more light sources 110 based on the temporal sequence. If, for example, the first lighting unit 102 comprises one light source, that light source may be controlled according to the sequence to create a dynamic light effect. If, for example, the first lighting unit 102 comprises a plurality of light sources 110, the plurality of light sources may be controlled according to the sequence.

Figure 2:
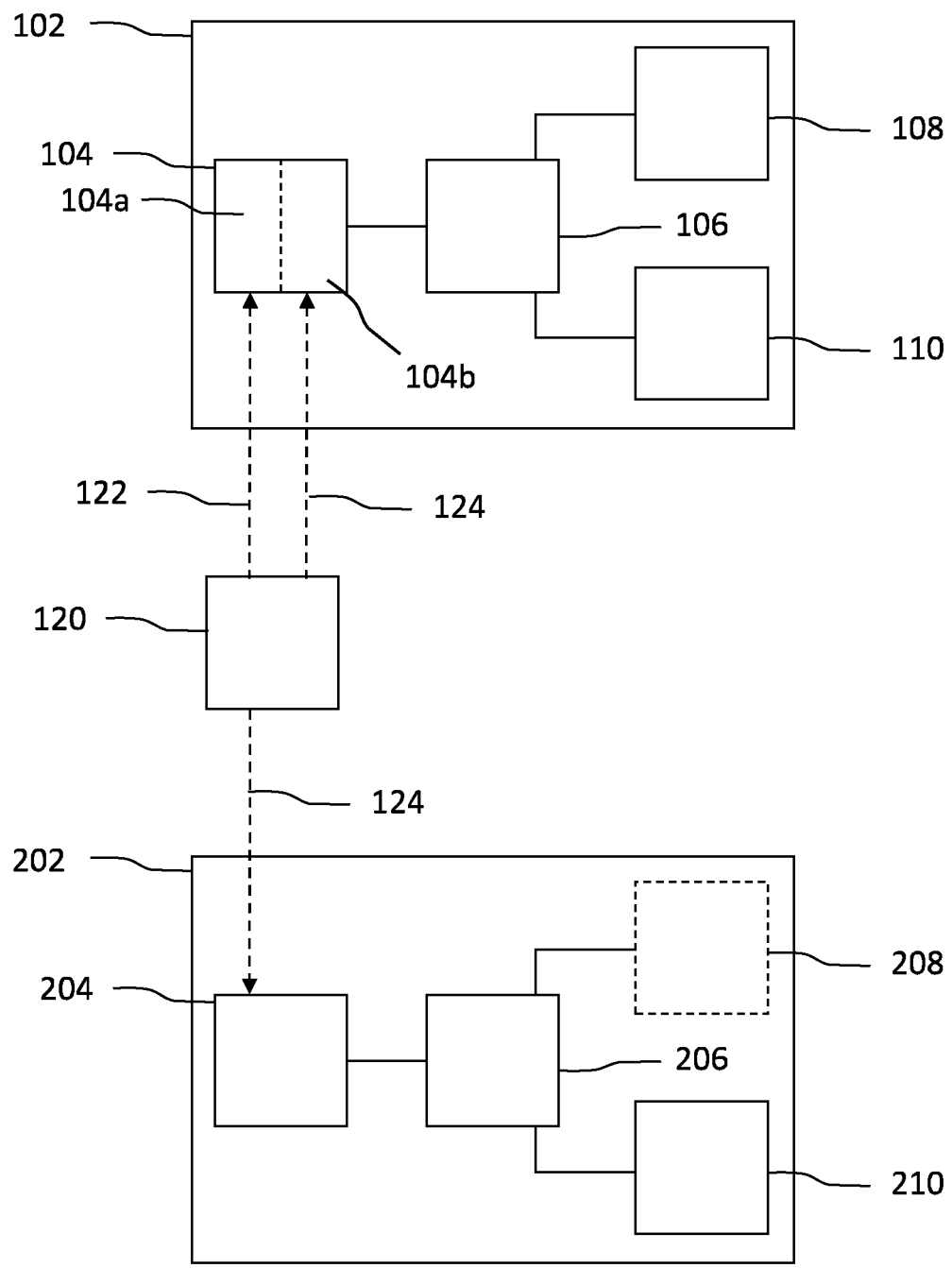
FIG. 2 shows schematically an embodiment of a lighting system comprising two lighting units and a controller for transmitting lighting control commands to the lighting units.

FIG. 2 illustrates an example of a lighting system 100 comprising a lighting controller 120 and a first lighting unit 102 according to the lighting controller 120 and the first lighting unit 102 of FIG. 1. The lighting system further comprises a second lighting unit 202. The second lighting unit 202 comprises one or more light sources 210, a communication unit 204 and a processor 206. Optionally, the second lighting unit 202 also comprises a memory 208 (e.g. for storing light scenes in a similar manner as the memory 108). The communication unit 204 is configured to receive the second lighting control command 124. In this example, the communication unit 204 is configured to communicate via the second communication technology, and the communication unit 204 is unable to receive lighting control commands via the first communication technology. The lighting system 100 illustrated in FIG. 2 may, for example, be a lighting system wherein the first lighting unit 102 is a more advanced lighting unit compared to the second lighting unit 202. The first lighting unit 102 may, for example, comprise a Zigbee-BLE communication unit 104 for receiving lighting control commands and the second lighting unit 202 may, for example, comprise a Zigbee only module. This enables the lighting controller 120 to communicate one or more first lighting control commands 122 indicative of one or more first light settings to the first lighting unit 102, which stores these in the memory 108, and then communicate the second lighting control command 124 indicative of one or more second light settings to both the first and the second lighting units 102, 202, whereupon they execute the received lighting control commands by controlling the respective light sources according to the respective light settings. As such, the lighting control commands may be executed substantially synchronized. This may, for example, be beneficial if the first lighting unit 102 comprises a plurality of individually controllable light sources 110. A plurality of first lighting control commands 122 addressed to the individually controllable light sources 110 may be communicated to the first lighting unit 102 (via the (e.g. higher bandwidth) first communication technology), which individually controllable light sources 110 may then be controlled upon receipt of the second lighting control command 124.

The second lighting control command 124 may be comprised in a broadcast message (a message transmitted to all devices (lighting units) in the network), a multicast/groupcast message (a message addressed to a plurality of devices (lighting units) in the network) or an inter-PAN message (a broadcast message transmitted to all devices (lighting units) in range, irrelevant of to which personal area network (PAN) they belong). The lighting controller 120 may communicate this message to the first and second lighting units 102, 202. In the example wherein the second lighting control command 124 is comprised in an inter-PAN message, the first and second lighting units 102, 202 need not be part of the same network. The benefit of transmitting a broadcast/multicast/inter-PAN message to communicate the second lighting control command 124 to the lighting units 102, 202, is that the execution of one or more first lighting control commands 122 and the second lighting control command 124 is performed at substantially the same moment in time (i.e. at the moment of receipt of the second lighting control command 124 by the respective lighting units).

The lighting system 100 may further comprise the lighting controller 120 which may comprise a transmitter configured to transmit the first and second lighting control commands 122, 124 to the first and second lighting units 102, 202. The lighting controller 120 may, for example, be configured to control the first and second lighting units 102, 202 to generate a dynamic light effect. The dynamic light effect may be preprogrammed, user-defined, based on media content, etc. The lighting controller 120 may be configured to transmit multiple instances of first and second control commands over time to realize the dynamic light effect.

The lighting controller 120 may comprise a communication module (not shown) for communicating lighting control commands with the lighting units 102, 202, and a processing module (not shown) for generating lighting control commands (e.g. based on media content, based on user inputs received via a user interface, based on routines, etc.).

The lighting controller 120 may be configured to communicate the first lighting control command 122 to the first lighting unit 102 directly, and to communicate the second lighting control command 124 to the first and second lighting units 102, 202 via an intermediary device (not shown).

The lighting controller 120 may, for example, be configured to communicate the first lighting control command 122 via a point-to-point communication technology such as BLE, and to communicate the second lighting control command 124 via a multi-hop communication technology such as Zigbee. The second lighting control command 124 may, for example, be communicated via another lighting unit, via a bridge, a hub, etc. In embodiments, the lighting controller 120 may be configured to communicate the second lighting control command 124 via a third (wireless) communication technology (e.g. Wi-Fi, BLE) to the intermediary device (e.g. a bridge), and the intermediary device may communicate the second lighting control command 124 via the second communication technology to the first and second lighting units 102, 202. Alternatively, the lighting controller 120 may be configured to communicate the second lighting control command 124 via the first communication technology to the intermediary device, and the intermediary device may communicate the second lighting control command 124 via the second communication technology to the (first and) second lighting unit(s).

The first and second lighting control commands may be based on media content (e.g. video content, audio content, video game content, etc.). The lighting controller 120 may be configured to obtain or generate the first and second lighting control commands based on media content. The lighting controller 120 may comprise a processor and an input for receiving the media content, and the processor may analyze the media content and generate lighting control commands based thereon. The media content may, for example, be rendered on a display, and the processor may be configured to generate lighting control commands by analyzing images of the media content, extracting colors from the analyzed images, and generating the lighting control commands based on the colors. The media content may, for example, be audio rendered on an audio rendering device, and the processor may be configured to generate lighting control commands by analyzing the audio of the media content. Techniques for generating lighting control commands based on media content are known in the art and will therefore not be discussed in detail. Alternatively, the lighting controller may comprise an input for receiving a light script associated with the media content. The light script may comprise lighting control instructions at predefined moment in time, which are to be executed substantially synchronous with the media content. Typically, when lighting units are controlled based on media content, many lighting control commands are required to be transmitted during short time periods. Hence, it is beneficial to use a first (higher bandwidth) communication technology to transmit first lighting control commands, which are buffered at the first lighting unit, and to use a second communication technology to transmit the second lighting control command to trigger execution of the control commands, especially when the second lighting unit 202 is unable to receive lighting control commands via the first communication technology.

The lighting controller 120 may be configured to switch between a first mode, wherein first lighting control commands 122 are to be executed upon receipt of the second lighting control command 124, and a second mode, wherein first lighting control commands 122 are to be executed immediately (without requiring the second lighting control command 124). For some light effects (e.g. certain dynamic light effects, or light effects generated based on media content) it is more important that the light effects are rendered immediately as compared to synchronized between multiple lighting units, whereas for others synchronicity is more important. The lighting controller may therefore switch between the first and second mode, for example based on the (media) content or based on a dynamic light effect that is to be rendered by the first and second lighting units 102, 202.

FIGS. 3a-3d illustrate examples of timelines (t) that indicate different embodiments of communication and execution of lighting control commands. The bold lines (a1, b1 and c1) are indicative of moments of communication of first lighting control commands 122, and the narrow dashed lines (a2, b2 and c2) are indicative of moments of communication of second lighting control commands 124. In these examples, the respective first lighting control commands a1, b1 and c1 may be executed upon receipt of their respective second lighting control commands a2, b2 and c2.

Figure 3A:
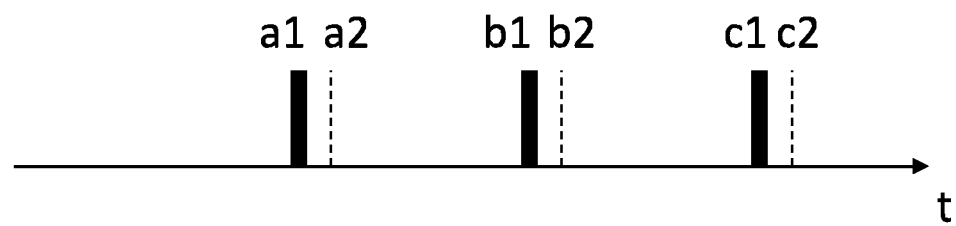
FIGS. 3a-3d illustrate examples of timelines that indicate different embodiments of reception and execution of lighting control commands.

FIG. 3a illustrates communications of lighting control commands to create a dynamic light effect over the period of time t. The lighting control commands may, for example, be generated in real time based on media content. The second lighting control commands b1, b2 and b3 are communicated right after the first lighting control commands a1, b1 and c1 to ensure that the light effect generated by the lighting units is synchronized with the video content.

Figure 3B:
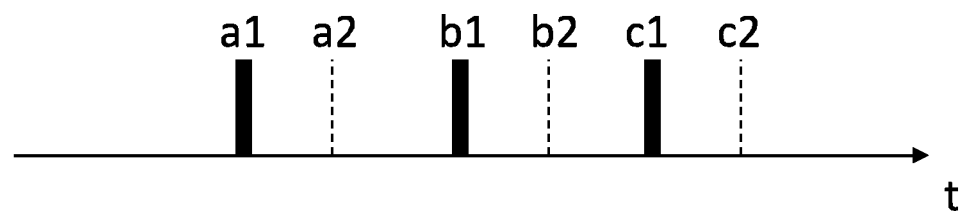

FIG. 3b illustrates communications of lighting control commands to create a dynamic light effect over the period of time t. The lighting control commands may, for example, be derived from a predefined light script which, for example, may be synchronized with media content, or it may be a predefined dynamic light scene selected by a user. The time period between communication of the first lighting control commands a1, b1 and c1 is longer compared to the example of FIG. 3a. This is possible because the light settings of the light script are predefined (as compared to generated in real-time).

Figure 3C:
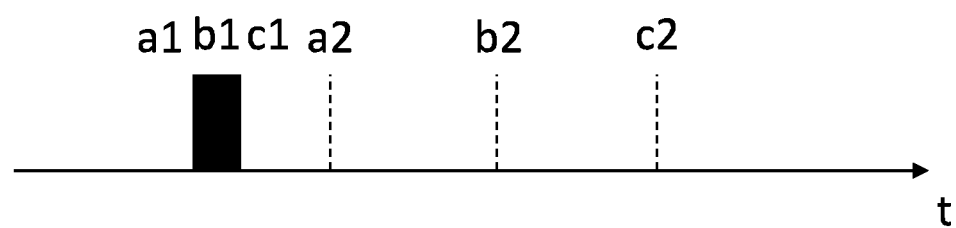
Figure 3D:
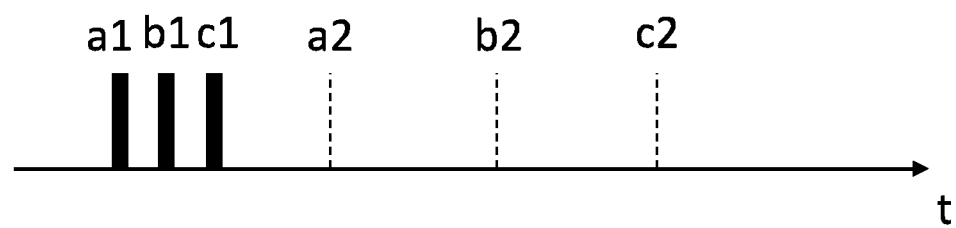

FIGS. 3c and 3d also illustrate communications of lighting control commands to create a dynamic light effect over the period of time t. Similar to the example in FIG. 3b, the lighting control commands may be derived from a predefined light script. In the example of FIG. 3c, the first lighting control commands a1, b1 and c1 are communicated in a single message, and the respective second lighting control commands a2, b2 and c2 are communicated as separate messages, whereupon the respective first lighting control commands a1, b1 and c1 are executed. In the example of FIG. 3d, the first lighting control commands a1, b1 and c1 are communicated as separate messages before the first second lighting control command a1 has been communicated. The respective second lighting control commands a2, b2 and c2 are communicated as separate messages, whereupon the respective first lighting control commands a1, b1 and c1 are executed.

Figure 4:
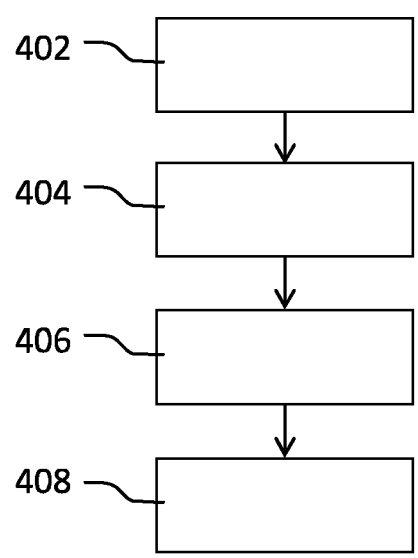
FIG. 4 shows schematically a method of controlling a lighting unit.

FIG. 4 shows schematically a method 400 of controlling a lighting unit 102 comprising one or more light sources 110 and a memory 108, and wherein the lighting unit 102 further comprises a first communication module 104 configured to communicate via a first wireless communication technology 104a and a second communication module 104b configured to communicate via a second wireless communication technology, the method 400 comprising:
- receiving 402, via the first communication module, a first lighting control command,
- storing 404 the first lighting control command in the memory,
- receiving 406, via the second communication module, a second lighting control command, and
- controlling 408 the one or more light sources according to the first lighting control command upon receiving the second lighting control command.

The method 400 may be executed by computer program code of a computer program product when the computer program product is run on a processing unit of a computing device, such as the processor 106 of the lighting unit 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A lighting system comprising a first lighting unit and a second lighting unit:
   the first lighting unit comprising:
   one or more light sources,
   a memory,
   a communication unit comprising a first communication module configured to communicate via a first wireless communication technology, and a second communication module configured to communicate via a second wireless communication technology, and
   a processor configured to receive, via the first communication module, a first lighting control command indicative of one or more first light settings, store the first lighting control command in the memory receive, via the second communication module, a second lighting control command indicative of one or more second light settings, and control the one or more light sources according to the first lighting control command upon receiving the second lighting control command, the second lighting unit comprising:

one or more light second sources a second communication unit configured to communicate via the second communication technology, and a second processor configured to receive, via the second communication unit, the second lighting control command and to control the one or more second light sources according to the second lighting control command upon receiving the second lighting control command.

2. The lighting system of claim 1, wherein the processor is further configured to control the one or more light sources according to the second lighting control command upon receiving the second lighting control command.

3. The lighting system claim 1, wherein the processor is configured to receive a plurality of first lighting control commands via the first communication module, to store the plurality of first lighting control commands in the memory, and to control the one or more light sources according to the plurality of first lighting control commands upon receiving the second lighting control command.

4. The lighting system of claim 3, wherein the lighting unit comprises a first light source and a second light source, and wherein a primary first lighting control command is addressed to the first light source and a secondary first lighting control command is addressed to the second light source, and wherein the processor is configured to control the first light source according to the primary first lighting control command and the second light source according to the secondary first lighting control command upon receiving the second lighting control command.

5. The lighting system of claim 3, wherein the processor is further configured to obtain information indicative of a temporal sequence of the plurality of first lighting control commands, and wherein the processor is configured to control the one or more light sources based on the temporal sequence.

6. The lighting system of claim 1, wherein the first wireless communication technology has a higher bandwidth than the second wireless communication technology.

7. The lighting system claim 1, wherein the first lighting unit is an LED strip and wherein the one or more light sources are a plurality of individually controllable light sources.

8. The lighting system claim 1, wherein the second lighting control command is comprised in a broadcast message, a multicast message or an inter-PAN message.

9. The lighting system claim 1, wherein the second lighting unit is unable to communicate via the first wireless communication technology.

10. The lighting system claim 1, wherein the lighting system further comprises a lighting controller comprising a transmitter configured to transmit the first and second lighting control commands.

11. The lighting system of claim 10, wherein the lighting controller is configured to communicate the first lighting control command to the first lighting unit directly, and to communicate the second lighting control command to the first and second lighting units via an intermediary device.

12. The lighting system of claim 10, wherein the lighting controller is configured to obtain or generate the first and second lighting control commands based on media content.

13. A method of controlling a first lighting unit and a second lighting unit, the first lighting unit comprising one or more light sources and a memory, and wherein the first lighting unit further comprises a communication unit comprising a first communication module configured to communicate via a first wireless communication technology and a second communication module configured to communicate via a second wireless communication technology, the second lighting unit comprising one or more light second sources and a second communication unit configured to communicate via the second communication technology, the method comprising:

receiving, via the first communication module, a first lighting control command indicative of one or more first light settings, storing the first lighting control command in the memory, receiving via the second communication module, a second lighting control command indicative of one or more second light settings, controlling the one or more light sources according to the first lighting control command upon receiving the second lighting control command, receiving, via the second communication unit the second lighting control command, and controlling the one or more second light sources according to the second lighting control command upon receiving the second lighting control command.

* * * * *